United States Patent
Park et al.

(10) Patent No.: US 10,044,041 B2
(45) Date of Patent: Aug. 7, 2018

(54) BINDER FOR SECONDARY BATTERIES AND SECONDARY BATTERY INCLUDING THE SAME

(71) Applicant: LG Chem, Ltd., Seoul (KR)

(72) Inventors: Eun Joo Park, Daejeon (KR); Min Ah Kang, Daejeon (KR); Dong Jo Ryu, Daejeon (KR)

(73) Assignee: LG Chem, Ltd. (KR)

( * ) Notice: Subject to any disclaimer, the term of this patent is extended or adjusted under 35 U.S.C. 154(b) by 294 days.

(21) Appl. No.: 14/766,213

(22) PCT Filed: May 22, 2014

(86) PCT No.: PCT/KR2014/004555
§ 371 (c)(1),
(2) Date: Aug. 6, 2015

(87) PCT Pub. No.: WO2014/189294
PCT Pub. Date: Nov. 27, 2014

(65) Prior Publication Data
US 2016/0156038 A1 Jun. 2, 2016

(30) Foreign Application Priority Data

May 23, 2013 (KR) ........................ 10-2013-0058604

(51) Int. Cl.
*H01M 4/62* (2006.01)
*H01M 4/13* (2010.01)
*H01M 10/052* (2010.01)

(52) U.S. Cl.
CPC .............. *H01M 4/622* (2013.01); *H01M 4/13* (2013.01); *H01M 10/052* (2013.01)

(58) Field of Classification Search
CPC ....... H01M 4/622; H01M 4/13; H01M 10/052
See application file for complete search history.

(56) References Cited

U.S. PATENT DOCUMENTS

| 4,419,471 A | 12/1983 | Nelsen et al. |
| 2007/0091544 A1 | 4/2007 | Terada et al. |
| 2013/0330622 A1 | 12/2013 | Sasaki |

FOREIGN PATENT DOCUMENTS

| CN | 1560943 A | 1/2005 |
| CN | 100421286 C | 9/2008 |
| CN | 101457131 A | 6/2009 |
| EP | 1184921 A2 | 3/2002 |
| JP | 2002304974 A | 10/2002 |
| JP | 2012104406 A | 5/2012 |
| JP | 2013073921 A | 4/2013 |
| KR | 20060105034 A | 10/2006 |
| KR | 20070090852 A | 9/2007 |
| KR | 20080008138 A | 1/2008 |
| WO | 2011061931 A1 | 5/2011 |
| WO | 2012115096 A1 | 8/2012 |

OTHER PUBLICATIONS

International Search Report for Application No. PCT/KR2014/004555 dated Aug. 18, 2014.

*Primary Examiner* — Laura S Weiner
(74) *Attorney, Agent, or Firm* — Lerner, David, Littenberg, Krumholz & Mentlik, LLP

(57) ABSTRACT

Disclosed are a binder with a core-shell structure for a secondary battery electrode, and a secondary battery including the same, wherein the core includes styrene-butadiene rubber (SBR), the shell includes a copolymer of two or more monomers selected from the group consisting of a conjugated diene-based monomer, a (meth)acrylic ester-based monomer, an acrylate-based monomer, a vinyl-based monomer, a nitrile-based monomer, and an ethylenically unsaturated carboxylic acid monomer, and the binder includes a functional group providing binding capacity to surfaces of the SBR particles. Such a binder provides excellent adhesive strength and elasticity and, thus, overall performance of a secondary battery including the same may be improved.

16 Claims, No Drawings

BINDER FOR SECONDARY BATTERIES AND SECONDARY BATTERY INCLUDING THE SAME

CROSS-REFERENCE TO RELATED APPLICATION

This application is a national phase entry under 35 U.S.C. § 371 of International Application No. PCT/KR2014/004555, filed May 22, 2014, which claims priority to Korean Patent Application No. 10-2013-0058604, filed on May 23, 2013, the disclosures of which are incorporated herein by reference.

TECHNICAL FIELD

The present invention relates to a binder for a secondary battery electrode. More particularly, the present invention relates to a binder with a core-shell structure for a secondary battery electrode, wherein the core includes styrene-butadiene rubber (SBR), the shell includes a copolymer of two or more monomers selected from the group consisting of a conjugated diene-based monomer, a (meth)acrylic ester-based monomer, an acrylate-based monomer, a vinyl-based monomer, a nitrile-based monomer, and an ethylenically unsaturated carboxylic acid monomer, and the binder includes a functional group providing binding capacity to surfaces of the SBR particles.

BACKGROUND ART

In line with rapid increase in use of fossil fuels, demand for alternative energy or clean energy is increasing. Thus, the field of power generation and electrochemical electricity storage is most actively studied.

As a representative example of electrochemical devices using electrochemical energy, secondary batteries are currently used and use thereof is gradually expanding.

Recently, as technology for portable devices, such as portable computers, portable phones, cameras, and the like, continues to develop and demand therefor continues to increase, demand for secondary batteries as energy sources is rapidly increasing. Among these secondary batteries, research on lithium secondary batteries having high energy density, high operating potential, long cycle lifespan and low self-discharge rate has been underway and such lithium secondary batteries are commercially available and widely used.

In addition, as interest in environmental problems is increasing, research into electric vehicles, hybrid electric vehicles, and the like that can replace vehicles using fossil fuels, such as gasoline vehicles, diesel vehicles, and the like, which are one of the main causes of air pollution, is underway. As a power source of electric vehicles, hybrid electric vehicles, and the like, nickel-metal hydride secondary batteries are mainly used. However, research into lithium secondary batteries having high energy density and high discharge voltage is actively carried out and some of the lithium secondary batteries are commercially available.

Conventional typical lithium secondary batteries use graphite as a negative electrode active material and charge and discharge thereof are performed by repeating a process that lithium ions of a positive electrode are inserted into and eliminated from a negative electrode. Even though there is a difference in the theoretical capacity of the battery depending upon kinds of electrode active materials, the charge/discharge capacity of the battery usually decreases as the number of charge/discharge cycle increases.

The primary cause of such a phenomenon is a failure to sufficiently fulfill functions of the electrode active material due to separation between the electrode active materials and/or between the electrode active material and current collector, resulting from volume changes of electrodes occurring during repeated charge/discharge cycles of the battery. Further, since the lithium ions inserted into the negative electrode are not normally released from the negative electrode during the insertion and elimination process, the active points of the negative electrode are decreased as the number of charge/discharge cycle increases. Consequently, further increase in the number of charge/discharge cycles also leads to decrease of the charge/discharge capacity and deterioration of life characteristics in the battery.

Thus, there is an urgent need in the art to study a binder and an electrode material that may have strong adhesive strength so as to prevent separation between electrode active material components or separation between an electrode active material and a current collector when manufacturing an electrode and may have strong physical properties so as to achieve structural stability of an electrode by controlling volume expansion of an electrode active material due to repeated charge/discharge and, accordingly, enhance battery performance.

A conventional solvent-based binder, i.e., polyvinylidene fluoride (PVdF), does not meet such requirement and thus, recently, a method of using binders prepared by preparing emulsion particles by aqueous polymerization of styrene-butadiene rubber (SBR) and mixing the emulsion particles with a neutralizing agent and the like has been proposed and is currently commercially available. These binders are eco-friendly and used in a small amount and thus may increase battery capacity. However, such a case also exhibits improved adhesive durability due to rubber elasticity but does not exhibit dramatically improved adhesive strength.

Therefore, there is an urgent need to develop a binder that enhances cycle characteristics of a battery, imparts structural stability to an electrode, and has high adhesive strength.

DISCLOSURE

Technical Problem

The present invention aims to address the aforementioned problems of the related art and to achieve technical goals that have long been sought.

As a result of a variety of extensive and intensive studies and experiments, the inventors of the present invention developed, as described below, a binder with a core-shell structure for a secondary battery electrode, wherein the core includes styrene-butadiene rubber (SBR), the shell includes a predetermined copolymer, and the binder includes a functional group providing binding capacity to surfaces of the SBR particles. The inventors confirmed that, when the binder is used, cycle characteristics of a battery and adhesive strength may be improved, thus completing the present invention.

Technical Solution

In accordance with one aspect of the present invention, provided is a binder with a core-shell structure for a secondary battery electrode, wherein the core includes styrene-butadiene rubber (SBR), the shell includes a copolymer of two or more monomers selected from the group consisting of a conjugated diene-based monomer, a (meth)acrylic ester-based monomer, an acrylate-based monomer, a vinyl-based monomer, a nitrile-based monomer, and an ethylenically unsaturated carboxylic acid monomer, and the binder includes a functional group providing binding capacity to surfaces of the SBR particles.

The binder according to the present invention has a core-shell structure and, thus, hardness of a core part may increase, thereby decreasing swelling of an electrolyte.

In particular, since a repeated unit of a styrene and butadiene monomer of a core part (SBR) has low affinity to a carbonate-based electrolyte, a swelling phenomenon of an electrolyte may be reduced. For example, in the cases of polystyrene and polybutadiene, swelling of the electrolyte at room temperature is approximately 25% with respect to the volume thereof.

Furthermore, the particle surfaces of the binder include the functional group and, as such, binding strength between the core part and the shell part is increased and elasticity may be imparted. As a result, the adhesive strength of the binder including the core part and the shell part increased and, as such, overall performance of a secondary battery may be improved.

A weight ratio of the core (SBR):the shell (copolymer) may be 95:5 to 5:95, particularly 90:10 to 10:90, more particularly 90:10 to 30:70, even more particularly 70:30 to 30:70. The weight ratios are ratios to exhibit optimal adhesive strength of the binder according to the present invention. Thus, when a weight ratio of the binder is outside the above weight ratio ranges, desired effects of the present invention may not be exhibited.

The copolymer of the shell part may include copolymers of monomers below, but the present invention is not limited thereto.

For example, the conjugated diene-based monomer may be at least one monomer selected from the group consisting of 1,3-butadiene, isoprene, 2,3-dimethyl-1,3-butadiene, and 1,3-pentadiene.

The (meth)acrylic ester-based monomer may be, for example, at least one monomer selected the group consisting of methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethyl hexyl acrylate, hydroxy propyl acrylate, lauryl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethyl hexyl methacrylate, 2-ethyl hexyl methacrylate, hydroxy ethyl methacrylate, and hydroxy propyl methacrylate.

The acrylate-based monomer may be, for example, at least one monomer selected from the group consisting of methacryloxy ethyl ethylene urea, beta-carboxy ethylacrylate, aliphatic monoacrylate, dipropylene diacrylate, ditrimethylolpropane tetraacrylate, hydroxyethyl acrylate, dipentaerythritol hexaacrylate, pentaerythritol triacrylate, pentaerythritol tetraacrylate, lauryl acrylate, ceryl acrylate, stearyl acrylate, lauryl methacrylate, ceryl methacrylate, butyl acrylate, glycidyl methacrylate, aryl methacrylate, and stearyl methacrylate.

The vinyl-based monomer, for example, may be at least one monomer selected the group consisting of styrene, o-, m- and p-methylstyrene, α-methylstyrene, β-methylstyrene, 2,4-dimethylstyrene, o-, m-, and p-ethylstyrene, p-t-butylstyrene, divinylbenzene and vinylnaphthalene.

The nitrile-based monomer, for example, may be at least one monomer selected from the group consisting of succinonitrile, sebaconitrile, nitrile fluoride, nitrile chloride, acrylonitrile, and methacrylonitrile.

The ethylenically unsaturated carboxylic acid monomer may be at least one monomer selected from the group consisting of an unsaturated monocarboxylic acid monomer such as acrylic acid, methacrylic acid, crotonic acid, isocrotonic acid, or the like, an unsaturated dicarboxylic acid monomer such as maleic acid, fumaric acid, citraconic acid, mesaconic acid, glutaconic acid, itaconic acid, or the like, and acid anhydrides thereof.

The shell part may include particularly a copolymer of an acrylate-based monomer and a vinyl-based monomer, more particularly a butylacrylate-styrene copolymer.

The binder according to the present invention includes a functional group providing binding capacity to particle surfaces of SBR and, as such, binding strength between SBR of the core part and the copolymer of the shell part may increase.

The functional group of the copolymer may be a polar group, and at least one selected from the group consisting of a hydroxyl group, a carboxy group, an amide group, an amino group, a sulfonic acid group, and the like, particularly a carboxy group. Such a polar group may be introduced through reaction between SBR, the monomers described above, and a predetermined material. The materials may be derived from compounds including the polar groups defined in the present invention. The compounds, for example, may be at least one selected from oxalic acid, adipic acid, formic acid, acrylic acid, acrylic acid derivatives, itaconic acid derivatives, and itaconic acid, more particularly acrylic acid and/or itaconic acid.

The compound may be included in an amount of greater than 1 wt % and less than 15 wt % based on the total weight of the monomer forming the shell part and, thus, may form a copolymer with other monomers and provide the functional group. The compound may be included in an amount of particularly 4 wt % to 12 wt %, more particularly 8 wt %.

A particle diameter of the binder according to the present invention may be 130 nm to 500 nm, particularly 180 nm to 350 nm, more particularly, 200 nm to 260 nm. Such particle diameter ranges are optimal ranges so as to exhibit effects according to application of the binder including the specific polar group of the present invention and, thus, diameter ranges outside the above ranges are not desirable.

The binder according to the present invention may be prepared according to conventional polymerization such as emulsion polymerization, suspension polymerization, dispersion polymerization, seeded polymerization, spray drying, or the like. Particularly, the binder may be prepared through emulsion polymerization.

Examples of an emulsifier used in such emulsion polymerization include oleic acid, stearic acid, lauric acid, fatty acid salts such as sodium or potassium salts of mixed fatty acids, and general anionic emulsifiers such as rosin acid and a reactive emulsifier for improving stability of latex may be preferably added. The emulsifier may be used alone or as a mixture of two emulsifiers or more.

In addition, as a polymerization initiator for emulsion polymerization, inorganic or organic peroxide may be used and, for example, a water-soluble initiator including potassium persulfate, sodium persulfate, ammonium persulfate and the like, and an oil-soluble initiator including cumene hydroperoxide, benzoyl peroxide and the like may be used. In addition, to promote initiation reaction of a peroxide, an activator in addition to the polymerization initiator may be further included. As the activator, at least one selected from the group consisting of sodium formaldehyde sulfoxylate, sodium ethylenediaminetetraacetate, ferrous sulfate and dextrose may be used.

Polymerization temperature and polymerization time may be properly determined depending on a polymerization method, a used polymerization initiator type, or the like. For example, the polymerization temperature may be approximately 50° C. to 200° C. and the polymerization time may be approximately 2 to 40 hours.

A material used as a dispersion medium for preparing the binder according to the present invention is not specifically limited and examples thereof includes water; alcohols such as methanol, ethanol, propanol, isopropanol, butanol, isobutanol, s-butanol, t-butanol, pentanol, isopentanol, and hexanol; ketones such as acetone, methyl ethyl ketone, methyl propyl ketone, ethyl propyl ketone, cyclopentanone, cyclohexanone, and cycloheptanone; ethers such as methyl ethyl ether, diethyl ether, dipropyl ether, diisopropyl ether, dibutyl ether, diisobutyl ether, di-n-amyl ether, diisoamyl ether, methyl propyl ether, methyl isopropyl ether, methyl butyl ether, ethyl propyl ether, ethyl isobutyl ether, ethyl n-amyl ether, ethyl isoamyl ether, and tetrahydrofuran; lactones such as gamma-butyrolactone and delta-butyrolactone; lactams such as beta-lactam; cyclic aliphatic compounds such as cyclopentane, cyclohexane, and cycloheptane; aromatic hydrocarbons such as benzene, toluene, o-xylene, m-xylene, p-xylene, ethyl benzene, propyl benzene, isopropyl benzene, butyl benzene, isobutyl benzene, and n-amyl benzene; aliphatic hydrocarbons such as heptane, octane, nonane, and decane; acyclic and cyclic amides such as dimethylformamide and N-methylpyrrolidone; esters such as methyl lactate, ethyl lactate, propyl lactate, butyl lactate, and methyl benzoate; and the like. Thereamong, a dispersion medium having a boiling point of 80° C. or more, preferably 85° C. or more is preferable with respect to a electrode manufacturing process.

Meanwhile, in the binder preparation process, an antioxidant and an antiseptic may be added. In particular, when a conjugated diene polymer is included in the binder, properties of a battery may be easily degraded due to softening, gelation, and the like during a battery operation process and, as such, lifespan of the battery may be shortened. Therefore, so as to reduce such degradation, an antioxidant is preferably used.

In addition, the binder may further include a cross linking agent, a coupling agent, a buffer, or the like, or combinations thereof.

The cross linking agent is a material for facilitating cross linking of the binder and may be added in an amount of 0 to 50 wt % based on the weight of the binder. As the cross linking agent, amines such as diethylene triamine, triethylene tetramine, diethylamino propylamine, xylene diamine, isophorone diamine, and the like; acid anhydrides such as dodecyl succinic anhydride, phthalic anhydride, and the like; and the like may be used. In addition, a polyamide resin, a polysulfide resin, a phenolic resin, and the like may used.

The coupling agent is a material for increasing adhesive strength between an active material and a binder and is characterized by having two or more functional groups. The coupling agent is used in an amount of 0 to 30 wt % based on the weight of the binder. So long as one of the functional groups forms a chemical bond through reaction with silicon, tin, or a hydroxyl group or a carboxy group on a surface of a graphite-based active material and the other group forms a chemical bond through reaction with the nanoscale composite according to the present invention, the coupling agent is not specifically limited. For example, the coupling agent may be a silane-based coupling agent such as triethoxysilylpropyl tetrasulfide, mercaptopropyl triethoxysilane, aminopropyl triethoxysilane, chloropropyl triethoxysilane, vinyl triethoxysilane, methacryloxypropyl triethoxysilane, glycidoxypropyl triethoxysilane, isocyanatopropyl triethoxysilane, cyanatopropyl trimethoxysilane, or the like.

The buffer may be added in an amount of 0 to 30 wt % based on the weight of the binder and may be one selected from the group consisting of $NaHCO_3$, NaOH, and $NH_4OH$.

In addition, the present invention provides an electrode for secondary batteries, in which the electrode active material and the conductive material are bound to the collector via the binder. The electrode may be a positive electrode or a negative electrode.

For example, the positive electrode is prepared by spreading a mixture of the positive electrode active material, the conductive material, the binder, and the like over the positive electrode collector and then drying, and the negative electrode is prepared by spreading a mixture of the negative electrode active material, the conductive material, the binder, and the like over the negative electrode collector and then drying.

The electrode active materials of the electrodes are materials which may cause electrochemical reaction and are classified by a positive electrode active material and a negative electrode active material depending upon electrode types.

The positive electrode active material as a lithium transition metal oxide includes two or more transition metals and, for example, may be a layered compound such as a lithium cobalt oxide ($LiCoO_2$), lithium nickel oxide ($LiNiO_2$) and the like substituted with one or more transition metals; lithium manganese oxide substituted with one or more transition metals; lithium nickel-based oxide represented by formula, $LiNi_{1+y}M_yO_2$ (where M includes at least one of Co, Mn, Al, Cu, Fe, Mg, B, Cr, Zn and Ga, and $0.01 \leq y \leq 0.7$); a lithium nickel cobalt manganese complex oxide represented by $Li_{1+z}Ni_bMn_cCo_{1-(b+c+d)}M_dO_{(2-e)}A_e$ (where $-0.5 \leq z \leq 0.5$, $0.1 \leq b \leq 0.8$, $0.1 \leq c \leq 0.8$, $0 \leq d \leq 0.2$, $0 \leq e \leq 0.2$ and $b+c+d<1$, M is Al, Mg, Cr, Ti, Si or Y, and A is F, P or Cl) such as $Li_{1+z}Ni_{1/3}Co_{1/3}Mn_{1/3}O_2$, $Li_{1+z}Ni_{0.4}Mn_{0.4}Co_{0.2}O_2$ and the like; and the like, but the present invention is not limited thereto.

The negative electrode active material according to the present invention may be, for example, carbon and graphite materials such as natural graphite, artificial graphite, expandable graphite, carbon fiber, hard carbon, carbon black, carbon nanotubes, fullerenes, and activated carbon; metals alloyable with lithium such as Al, Si, Sn, Ag, Bi, Mg, Zn, In, Ge, Pb, Pd, Pt, Ti, and the like and compounds including these elements; complexes of metals and compounds thereof and complexes of carbon and graphite materials; and lithium-containing nitrides. Thereamong, a carbon-based active material, a silicon-based active material, a tin-based active material, or a silicon-carbon-based active material is more preferable and may be used alone or in combination of two or more thereof.

The conductive material as an ingredient to improve conductivity of an electrode active material may be added in an amount of 1 to 30 wt % based on the total weight of an electrode mixture. There is no particular limit as to the conductive material, so long as it does not cause chemical changes in the fabricated secondary battery and has conductivity. Examples of conductive materials include graphite such as natural graphite and synthetic graphite; carbon black such as carbon black, acetylene black, Ketjen black, channel black, furnace black, lamp black, and thermal black; carbon derivatives such as carbon nanotubes and fullerenes; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

An electrode collector of the electrode is a portion in which electrons move through electrochemical reaction of an active material. In accordance with electrode type, an electrode collector is classified into a positive electrode collector and a negative electrode collector.

The positive electrode collector is typically fabricated to a thickness of 3 to 500 μm. The positive electrode collector is not particularly limited so long as it does not cause chemical changes in the fabricated secondary battery and has high conductivity. For example, the positive electrode collector may be made of stainless steel, aluminum, nickel, titanium, sintered carbon, aluminum or stainless steel surface-treated with carbon, nickel, titanium, or silver, or the like.

The negative electrode collector is typically fabricated to a thickness of 3 to 500 μm. The negative electrode collector is not particularly limited so long as it does not cause chemical changes in the fabricated secondary battery and has conductivity. For example, the positive electrode collector may be made of copper, stainless steel, aluminum, nickel, titanium, sintered carbon, copper or stainless steel surface-treated with carbon, nickel, titanium, or silver, aluminum-cadmium alloys, or the like.

The collectors have micro irregularities on surfaces thereof and, as such, binding capacity of the electrode active materials may be reinforced. In addition, the collectors may be used in any of various forms including films, sheets, foils, nets, porous structures, foams, and non-woven fabrics.

The mixture (electrode mixture) of an electrode active material, a conductive material, a binder, and the like may further include at least one material selected from the group consisting of a viscosity controlling agent and a filler.

The viscosity controlling agent is an ingredient for controlling the viscosity of an electrode mixture so as to facilitate a mixing process of an electrode mixture and a process of spreading the same over a collector and may be added in an amount of maximally 30 wt % based on the total weight of the electrode mixture. Examples of such a viscosity controlling agent include carboxymethylcellulose, polyvinylidene fluoride, and the like, but the present invention is not limited thereto. In some cases, the solvents described above may also function as the viscosity controlling agent.

The filler is used as a component to inhibit positive electrode expansion and is optionally used. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

The present invention also provides a lithium secondary battery including the electrode for a secondary battery.

Generally, the lithium secondary battery further includes a separator and a lithium salt-containing non-aqueous electrolyte in addition to an electrode.

The separator is disposed between the positive electrode and the negative electrode and an insulating thin film having high ion permeability and mechanical strength is used as the separator. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing non-aqueous electrolyte is composed of a non-aqueous electrolyte and a lithium salt.

The non-aqueous electrolyte may be, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

The lithium salt is a material that is readily soluble in the non-aqueous electrolyte. Examples thereof include LiCl, LiBr, LiI, $LiClO_4$, $LiBF_4$, $Li_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

As desired, an organic solid electrolyte, an inorganic solid electrolyte and the like may be used.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-ethylene carbonate (FEC), or the like.

The secondary battery according to the present invention may be desirably used as power supply of electric vehicles, hybrid electric vehicles, and the like requiring particularly long cycle life and long rate characteristics.

MODE FOR INVENTION

Now, the present invention will be described in more detail with reference to the following examples. These examples are provided only for illustration of the present invention and should not be construed as limiting the scope and spirit of the present invention.

Example 1

(Preparation of Binder Polymer)

10 wt % of styrene-butadiene-based rubber as a core and 90 wt % of a polymerized monomer as a shell part were mixed with respect to total monomers and polymerized for approximately 4 hours at 75° C. The monomer forming the shell part includes 59 g of butyl acrylate, 30 g of styrene, 2 g of glycidyl methacrylate, 8 g of a mixture of acrylic acid and itaconic acid, 1 g of a cross linking agent, 0.2 g of an emulsifier, and 0.2 g of $NaHCO_3$ as a buffer, based on a weight of 100 g. In this regard, potassium persulfate is used as a polymerization initiator. A binder for secondary batteries including polymer particles, in which monomers and cross linking agents are polymerized through the polymerization described above, was prepared.

(Preparation of Electrode Slurries and Electrodes)

To prepare a negative electrode, water as a dispersion medium was used and 96.9 parts by weight of natural graphite, 0.4 parts by weight of a conductive material, 1.5 parts by weight of the binder for secondary batteries prepared above, and 1.2 parts by weight of carboxymethylcellulose as a thickener were mixed. A slurry for the negative electrode was manufactured such that the amount of total solids was 55%, and then spread over copper foil in a thickness of 100 micrometers. Subsequently, the spread slurry was vacuum dried and then pressed, thereby preparing a negative electrode.

To prepare a positive electrode, N-methyl-2-pyrrolidone (NMP) as a dispersion medium was used. 96 parts by weight of $LiCoO_2$ as an active material, 2 parts by weight of a conductive material, and 2 parts by weight of a PVDF binder were mixed to prepare a slurry. The resultant slurry was coated over aluminum foil and then dried, followed by pressing. As a result, a positive electrode was manufactured.

(Manufacture of Lithium Secondary Battery)

An opening with a surface area of 13.33 $cm^2$ was formed in the manufactured negative electrode plate and an opening with a surface area of 12.60 $cm^2$ was formed in a positive electrode plate, thereby completing manufacture of a mono cell. A tap was attached to upper portions of the positive electrode and the negative electrode and a separator prepared by a microporous polyolefin film was interposed between the negative electrode and the positive electrode, followed by loading in an aluminum pouch. Subsequently, 500 mg of an electrolyte was injected into the pouch. To prepare the electrolyte, a solvent of ethyl carbonate (EC): diethyl carbonate (DEC):ethyl-methyl carbonate (EMC) mixed in a volume ratio of 4:3:3 was used and a $LiPF_6$ electrolyte was dissolved to a concentration of 1 M in the solvent. Subsequently, the pouch was sealed using a vacuum packaging machine and stood for 12 hours at room temperature. Subsequently, a constant current was charged in a ratio of approximately 0.05 and then constant-voltage charge was performed to maintain voltage until the current decreased to approximately 1/6. In this regard, since gases are generated inside the cell, degassing and resealing were preformed. As a result, a lithium secondary battery was completed.

Example 2

A lithium secondary battery was manufactured in the same manner as in Example 1, except that the core was added in an amount of 30 wt % and the shell part was added in an amount of 70 wt %.

Example 3

A lithium secondary battery was manufactured in the same manner as in Example 1, except that the core was added in an amount of 50 wt % and the shell part was added in an amount of 50 wt %

Example 4

A lithium secondary battery was manufactured in the same manner as in Example 1, except that the core was added in an amount of 70 wt % and the shell part was added in an amount of 30 wt %

Example 5

A lithium secondary battery was manufactured in the same manner as in Example 1, except that the core was added in an amount of 90 wt % and the shell part was added in an amount of 10 wt %

Example 6

A lithium secondary battery was manufactured in the same manner as in Example 4, except that a mixture of acrylic acid and itaconic acid among the monomers forming the shell part was added in an amount of 12 g.

Example 7

A lithium secondary battery was manufactured in the same manner as in Example 4, except that a mixture of acrylic acid and itaconic acid among the monomers forming the shell part was added in an amount of 4 g.

Comparative Example 1

A lithium secondary battery was manufactured in the same manner as in Example 1, except that a binder was prepared using styrene-butadiene rubber (SBR) used as the core part instead of the binder with a core-shell structure.

Comparative Example 2

A lithium secondary battery was manufactured in the same manner as in Example 1, except that a binder was prepared using latex polymerized according to the monomer composition of the shell part instead of the binder with a core-shell structure.

Comparative Example 3

A lithium secondary battery was manufactured in the same manner as in Example 1, except that a negative electrode was manufactured using a slurry for negative electrodes in which NMP was used as a dispersion medium and 95 parts by weight of natural graphite, 1 part by weight of a conductive material, and 4 parts by weight of PVDF binder were added to NMP and dispersed.

Comparative Example 4

A lithium secondary battery was manufactured in the same manner as in Example 4, except that acrylic acid and itaconic acid of the monomers forming the shell part were not added.

Experimental Example 1

Fundamental properties of the binders prepared according to Examples 1 to 7 and Comparative Examples 1 to 4 were measured. Results are summarized in Table 1 below.

TABLE 1

|  | Particle diameter (nm) | Viscosity (cP) | pH | Tg (degree) |
|---|---|---|---|---|
| Example 1 | 330 | 19 | 3.4 | 7.4 |
| Example 2 | 256 | 19 | 3.4 | 6.5 |
| Example 3 | 242 | 19 | 4.5 | 3.5 |
| Example 4 | 201 | 20 | 6.3 | −13.5 |
| Example 5 | 178 | 20 | 6.7 | −18.5 |
| Example 6 | 196 | 19 | 6.2 | −13.2 |
| Example 7 | 204 | 19 | 6.3 | −13.5 |
| Comparative Example 1 | 171 | 81 | 7.0 | −20 |
| Comparative Example 2 | 380 | 20 | 3.7 | 4 |
| Comparative Example 3 | — | — | — | −35 |
| Comparative Example 4 | 201 | 19 | 6.4 | −13.4 |

As shown in Table 1, it can be confirmed that, in the binders (Examples 1 to 5) with the core-shell structure, the particle diameter increases with increasing amount of the shell part polymer with respect to the core.

Experimental Example 2

<Tensile Test>

A tensile test of each of the binders prepared according to Examples 1 to 7 and Comparative Examples 1 to 4 was carried out. A variety of properties such as modulus, tensile strain, stress, and the like through the relation between stress and strain, according to a stress-strain curve, formed inside the binder by applying a load to the binder were measured and summarized in Table 2 below. The binder dispersed in the solvent was spread over a PET film in a constant thickness and dried. Subsequently, the binder film was cut into a size of 1 cm*4 cm, thereby completing manufacture of a specimen. Experiments were performed using the specimen.

TABLE 2

|  | Tensile strain (%) | Stress (N/mm$^2$) | Modulus (N/mm$^2$) |
|---|---|---|---|
| Example 1 | 217 | 10 | 41 |
| Example 2 | 273 | 11 | 42 |
| Example 3 | 309 | 13 | 46 |
| Example 4 | 365 | 14 | 57 |
| Example 5 | 375 | 16 | 71 |
| Example 6 | 299 | 13 | 52 |
| Example 7 | 359 | 14 | 55 |
| Comparative Example 1 | 495 | 8 | 25 |
| Comparative Example 2 | 356 | 10 | 53 |
| Comparative Example 3 | 18 | 20 | 692 |
| Comparative Example 4 | 357 | 15 | 57 |

Experimental Example 3

<Swelling Test of Electrolyte>

An electrolyte swelling test of each of the binders prepared according to Examples 1 to 7 and Comparative Examples 1 to 4 was carried out and volume change thereof is summarized in Table 3 below. The binder dispersed in the solvent was spread over a PET film and dried. Subsequently, the binder film was cut into a size of 1.5 cm*8 cm, thereby completing manufacture of a specimen. The manufactured specimen was impregnated with an electrolyte and stored for four hours at high temperature, namely, 90° C. The extended length of the stored film was confirmed and converted to a volume. The electrolyte used in the swelling test was a mixed solvent of EC:DEC:EMC in a ratio of 4:3:3, in which a lithium salt (LiPF$_6$) was not included.

TABLE 3

|  | Electrolyte swelling (vol %) |
|---|---|
| Example 1 | 130 |
| Example 2 | 63 |
| Example 3 | 58 |
| Example 4 | 45 |
| Example 5 | 45 |
| Example 6 | 44 |
| Example 7 | 46 |
| Comparative Example 1 | 43 |
| Comparative Example 2 | 170 |
| Comparative Example 3 | 51 |
| Comparative Example 4 | 47 |

As shown in Table 3, it can be confirmed that, in the binders with the core-shell structure according to Examples 1 to 5, swelling of electrolytes is decreased with increasing styrene-butadiene core amounts. This is caused by characteristics of the polymerized monomers and, concretely, low affinity of styrene and butadiene to the carbonate-based electrolyte. In the case of Comparative Example 2, the butadiene monomer is not included and, thus, low electrolyte swelling was measured. It can be confirmed that, when the amount of styrene-butadiene core is 70 wt % or more (Examples 4 to 5), swelling thereof is the same as a conventional styrene-butadiene core (Comparative Example 1).

Experimental Example 4

<Adhesive Strength Test>

When the binders according to Examples 1 and 7 and Comparative Examples 1 and 4 were used in a negative electrode, adhesive strength between a composition for a negative electrode and a collector was measured. Each of the negative electrodes manufactured according to Examples 1 to 7 and Comparative Examples 1 to 4 was cut into a certain size and fixed on a glass slide. Subsequently, 180-degree peel strength was measured while peeling a collector. Results are summarized in Table 4 below. For evaluation, the peel strength was measured five times or more and an average value thereof was calculated.

TABLE 4

|  | Adhesive strength (gf/cm) |
| --- | --- |
| Example 1 | 16.9 |
| Example 2 | 17.1 |
| Example 3 | 18.2 |
| Example 4 | 19.7 |
| Example 5 | 20.2 |
| Example 6 | 14.7 |
| Example 7 | 17.6 |
| Comparative Example 1 | 14.2 |
| Comparative Example 2 | 19.9 |
| Comparative Example 3 | 8 |
| Comparative Example 4 | 16.1 |

As shown in Table 4, it can be confirmed that adhesive strengths of the negative electrodes according to Examples 1 to 5 of the present invention are higher than Comparative Examples 1 and 3 and similar to the binder according to Comparative Example 2 prepared using the monomer composition of the shell part. This is because adhesive strengths thereof were improved by applying the monomer including the polar group to the shell part.

It can be confirmed that, through the experimental example, binder synthesis is easy when the monomers, namely, acrylic acid and itaconic acid, including the functional groups are included within a proper range (Examples 4 and 7), and conversion rates in Example 6 and Comparative Example 4, where the monomers including the functional groups were added in an amount of 12 g or 0 g, are approximately 80%. In addition, it can be confirmed that, in the cases of the core-shell binders including 70 wt % of the core and 30 wt % of the shell part, the core-shell binder including the shell part may be easily synthesized and performance thereof is excellent when the monomers containing the functional group are included in amounts of 4 g and 8 g, respectively.

Experimental Example 5

<Battery Test>

A charge/discharge test of each of the batteries manufactured according to Examples 1 to 7 and Comparative Examples 1 to 4 was carried out. First, charge/discharge was carried out two times at a charge/discharge current of 0.2 C, a charge final voltage of 4.2 V (Li/Li+), and a discharge final voltage of 2.5 V (Li/Li+). Subsequently, another charge/discharge test was carried out 48 times at a charge/discharge current density of 1 C, a charge final voltage of 4.2 V (Li/Li+), and a discharge final voltage of 3 V (Li/Li+). All charging was carried out at a constant current/constant voltage and a final current of constant voltage charge was 0.05 C. After completing a 50 cycle test, charge/discharge efficiency at a first cycle (initial efficiency and capacity retention ratio after 50 cycles) was found. In addition, a charge capacity at a 50th cycle was divided by a charge capacity at the first cycle to find a capacity ratio (50th/1st). The found capacity ratio was regarded as a capacity retention ratio. Results are summarized in Table 5 below.

TABLE 5

|  | Initial efficiency (%) | Capacity retention ratio after 50 cycles (%) |
| --- | --- | --- |
| Example 1 | 91.7 | 91.0 |
| Example 2 | 92.0 | 91.7 |
| Example 3 | 92.2 | 91.8 |
| Example 4 | 92.8 | 92.5 |
| Example 5 | 92.7 | 92.4 |
| Example 6 | 91.6 | 90.2 |
| Example 7 | 92.3 | 91.8 |
| Comparative Example 1 | 90.8 | 90.2 |
| Comparative Example 2 | 91.3 | 89.9 |
| Comparative Example 3 | 89.1 | 87.5 |
| Comparative Example 4 | 91.0 | 90.9 |

As shown in Table 5, it can be confirmed that the batteries using the binder with core-shell structure according to Examples 1 to 5 have a higher initial efficiency and a higher capacity after 50 cycle charge/discharge, when compared to the lithium ion batteries using the binders according to Comparative Examples, and, thus, have improved lifespan characteristics. This is because the binder with the core-shell structure provides properties of a conventional styrene-butadiene binder, namely, elasticity and low electrolyte swelling characteristics and, thus, polar groups of particle surfaces increases. Finally, adhesive strength of the binder including the polar groups is improved and, as such, overall performance of the secondary batteries is considered as being improved.

INDUSTRIAL APPLICABILITY

As described above, a binder for a secondary battery electrode according to the present invention has a core-shell structure, wherein the core includes SBR and the shell includes a predetermined copolymer. Accordingly, hardness of the core part may be increased and, as such, swelling of an electrolyte may be reduced.

In addition, the binder includes a functional group providing binding capacity to surfaces of the SBR particles and, thus, excellent adhesive strength and elasticity may be provided, thereby improving overall performance such as lifespan characteristics and the like of a secondary battery including the same.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A binder with a core-shell structure for a secondary battery electrode, wherein the core comprises styrene-butadiene rubber (SBR), the shell comprises a copolymer of an acrylate-based monomer and a vinyl-based monomer and optionally one or more monomers selected from the group consisting of a conjugated diene-based monomer, a (meth) acrylic ester-based monomer, a nitrile-based monomer, and an ethylenically unsaturated carboxylic acid monomer, and the binder comprise a functional group providing binding capacity to particle surfaces of the shell, wherein the vinyl-based monomer is at least one monomer selected from the group consisting of styrene, o-, m-, and p-methylstyrene, α-methylstyrene, β-methylstyrene, 2,4-dimethylstyrene, o-, m-, and p-ethylstyrene, p-t-butylstyrene, divinylbenzene, and vinylnaphthalene, and wherein the functional group is a polar group, and the polar group is at least one selected from the group consisting of a hydroxyl group, a carboxyl group, an amide group, an amino group, and a sulfonic acid group.

2. The binder according to claim 1, wherein a weight ratio of the core (SBR):the shell (copolymer) is 95:5 to 5:95.

3. The binder according to claim 2, wherein a weight ratio of the core (SBR):the shell (copolymer) is 90:10 to 10:90.

4. The binder according to claim 1, wherein the conjugated diene-based monomer is at least one monomer selected from the group consisting of 1,3-butadiene, isoprene, 2,3-dimethyl-1,3-butadiene, and 1,3-pentadiene.

5. The binder according to claim 1, wherein the (meth) acrylic ester-based monomer is at least one monomer selected the group consisting of methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethyl hexyl acrylate, hydroxy propyl acrylate, lauryl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethyl hexyl methacrylate, 2-ethyl hexyl methacrylate, hydroxy ethyl methacrylate, and hydroxy propyl methacrylate.

6. The binder according to claim 1, wherein the acrylate-based monomer is at least one monomer selected from the group consisting of methacryloxy ethyl ethylene urea, beta-carboxy ethyl acrylate, aliphatic monoacrylate, dipropylene diacrylate, ditrimethylolpropane tetraacrylate, hydroxyethyl acrylate, dipentaerythritol hexaacrylate, pentaerythritol triacrylate, pentaerythritol tetraacrylate, lauryl acrylate, ceryl acrylate, stearyl acrylate, lauryl methacrylate, ceryl methacrylate, butyl acrylate, glycidyl methacrylate, aryl methacrylate, and stearyl methacrylate.

7. The binder according to claim 1, wherein the nitrile-based monomer is at least one monomer selected from the group consisting of succinonitrile, sebaconitrile, nitrile fluoride, nitrile chloride, acrylonitrile, and methacrylonitrile.

8. The binder according to claim 1, wherein the ethylenically unsaturated carboxylic acid monomer is at least one monomer selected from the group consisting of an unsaturated monocarboxylic acid monomer such as acrylic acid, methacrylic acid, crotonic acid, isocrotonic acid, or the like, an unsaturated dicarboxylic acid monomer such as maleic acid, fumaric acid, citraconic acid, mesaconic acid, glutaconic acid, itaconic acid, or the like, and acid anhydrides thereof.

9. The binder according to claim 1, wherein the shell comprises a butyl acrylate-styrene copolymer.

10. The binder according to claim 1, wherein the polar group is a carboxyl group.

11. The binder according to claim 1, wherein the polar group is derived from at least one compound selected from the group consisting of oxalic acid, adipic acid, formic acid, acrylic acid, and itaconic acid.

12. The binder according to claim 1, wherein a particle diameter of the binder is 130 nm to 500 nm.

13. The binder according to claim 12, wherein a particle diameter of the binder is 180 nm to 350 nm.

14. An electrode for secondary batteries wherein an electrode active material and a conductive material are bound to a collector via the binder according to claim 1.

15. A secondary battery comprising the electrode according to claim 14.

16. A binder with a core-shell structure for a secondary battery electrode, wherein the core comprises styrene-butadiene rubber (SBR), the shell comprises a copolymer of an acrylate-based monomer and a vinyl-based monomer and optionally one or more monomers selected from the group consisting of a conjugated diene-based monomer, a (meth) acrylic ester-based monomer, a nitrile-based monomer, and an ethylenically unsaturated carboxylic acid monomer, and the binder comprise a functional group providing binding capacity to particle surfaces of the shell, wherein a particle diameter of the binder is 130 nm to 500 nm.

* * * * *